United States Patent [19]

Yang

[11] Patent Number: 4,799,336
[45] Date of Patent: Jan. 24, 1989

[54] DUST COLLECTING SYSTEM FOR BENCH GRINDER

[76] Inventor: Tai-Her Yang, 5-1 Taipin St., Si-Ru Town, Dzan-Hwa, Taiwan, R.O.C., Taiwan

[21] Appl. No.: 30,679

[22] Filed: Mar. 26, 1987

[51] Int. Cl.⁴ .............................................. B24B 31/12
[52] U.S. Cl. ........................................ 51/102; 51/273; 51/238 R
[58] Field of Search ................ 51/102, 268, 270, 273, 51/235, 424, 238 R

[56] References Cited

U.S. PATENT DOCUMENTS

| | | | |
|---|---|---|---|
| 1,255,230 | 2/1918 | Roese | 51/270 |
| 2,006,108 | 6/1935 | Montuori | 51/270 |
| 2,236,232 | 3/1941 | Brescka et al. | 51/270 |
| 4,325,292 | 4/1982 | McNinney, Jr. et al. | 51/424 |

Primary Examiner—Frederick R. Schmidt
Assistant Examiner—Maurina Rachuba
Attorney, Agent, or Firm—Leonard Bloom

[57] ABSTRACT

An apparatus for exhausting particulate matter from a bench grinder of the type having a working element which rotates in a circular direction about an axis of rotation for contacting a workpiece, thereby producing particulate matter. The improvement includes a means for creating a current of air which flows past the working element producing a current of air having particulate matter therein. This means also outwardly-exhausts the current of air having the particulate matter therein from the working element along the axis of rotation. A reservoir receives the outwardly-exhausted current and a filter separates the particulate matter from the current of air. Means is provided for exhausting the cleaned current of air.

2 Claims, 6 Drawing Sheets

DUST COLLECTING SYSTEM FOR BENCH GRINDER

CROSS REFERENCE TO RELATED APPLICATION

This application is related to the U.S. patent application Ser. No. 910,278 (now U.S. Pat. No. 4,665,656) for, an improved anti-polution design for a bench grinder.

FIELD OF THE INVENTION

In this addition, the applicant, based on the original design, one step ahead, made an improvement on a cover (housing) of a wind blowing pump (a centrifugal wind pump), the provision of several parts at an entrance (grinding point aperture) and filter equipments, including easy to disassemble, rear position system filter box, an extending cover (a reservoir), a wind pump and a filter box that is connected to a bench grinder with a snake pipe. This apparatus is designed for exhausting particulate matter from a bench grinder having a working element which rotates in a circular direction about an axis of rotation for contacting a workpiece, thereby producing particulate matter. The improvement of this apparatus is that the particulate matter is outwardly-exhausted from the working element along the axis of rotation.

One step ahead, by using a tool rest that has ventilation holes to reduce the wind resistance at the entrance and enhance anti-polution efficiency of the dust inhalation.

BACKGROUND OF THE INVENTION

A bench grinder is a widely applied basic manufacturing tool. But a presently used bench grinder does not have an inexpensive anti-polution equipment. While using it, it always causes iron dust to spread all over. Not only its environment is polluted, hard to clean, but also causes damage to a respiratory organ of the user. The problem should not be neglected.

The design is a continuation application of Ser. No. 910,278. It has a motor, a grinder driven by the motor (in a circular direction about an axis of rotation) and an operation switch as indicated in the original application. The main improvements includes: easy to disassemble rear position system filter box, an extending cover (a reservoir), a wind pump and a filter box that is connected to a grinder with a snake pipe. One step ahead, by using a tool rest that has ventilation holes to reduce the wind resistance at the entrance, to permit a current of air to flow therethrough and enhance anti-polution efficiency of the dust inhalation.

DETAILED DESCRIPTION OF THE INVENTION

Figure 1:
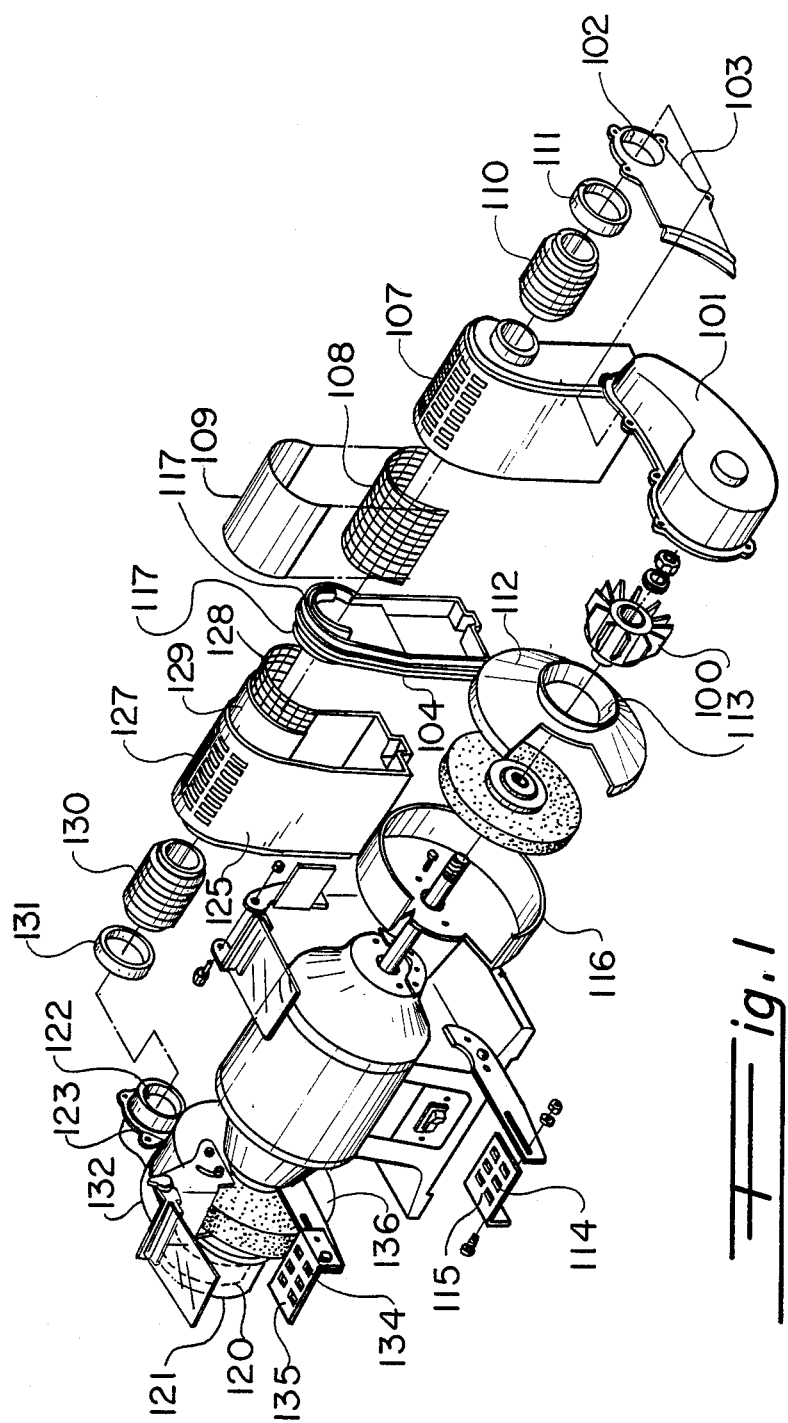
FIG. 1. A disassembled view of an implementation example of this improved design.
Figure 2:
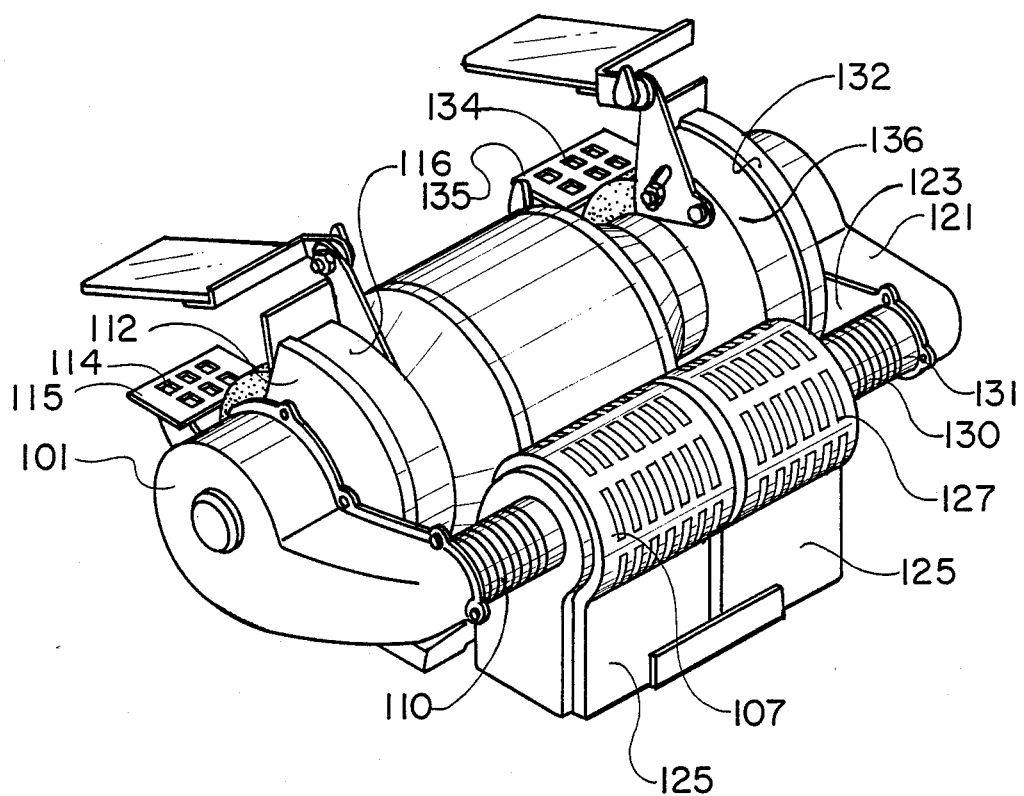
FIG. 2. A solid view of the implementation example after its assembly is completed.
Figure 3:
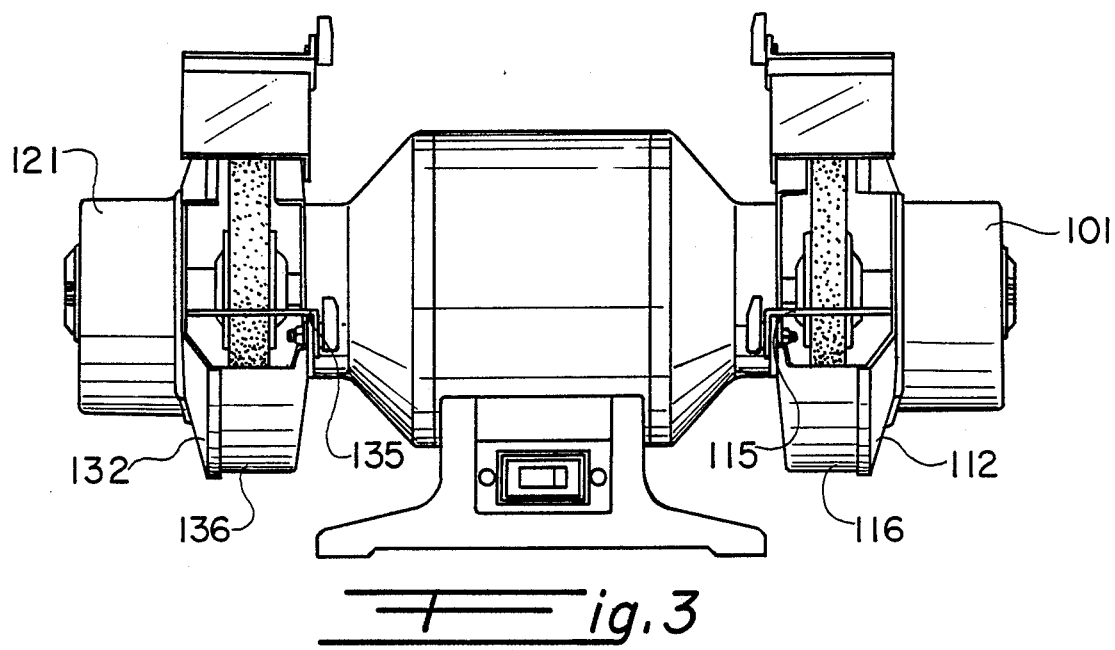
FIG. 3. A front view of the implementation example.
Figure 4:
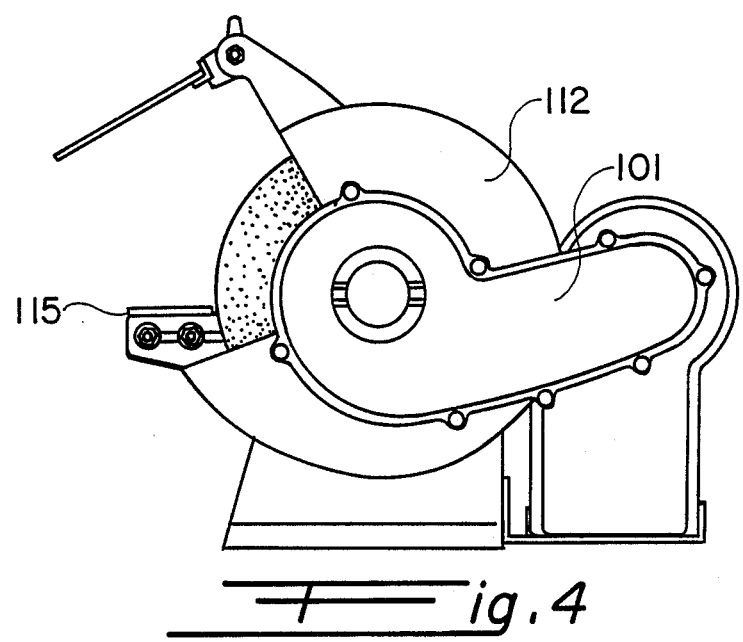
FIG. 4. A right side view of the implementation example.
Figure 5:
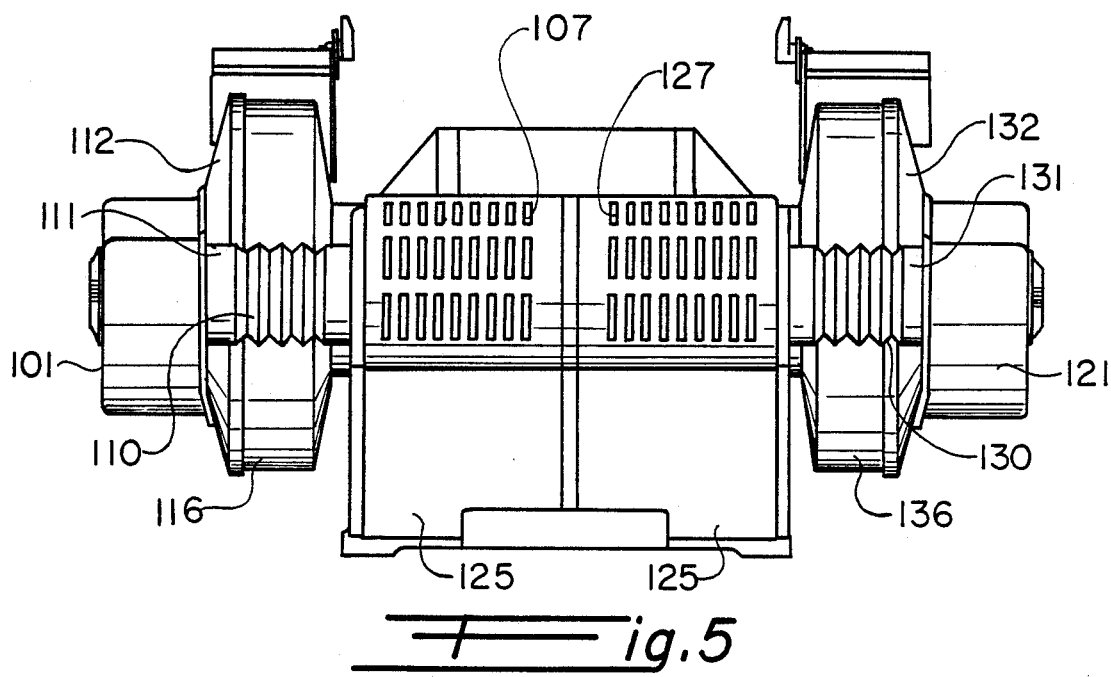
FIG. 5. A back side view of the implementation example.
Figure 6:
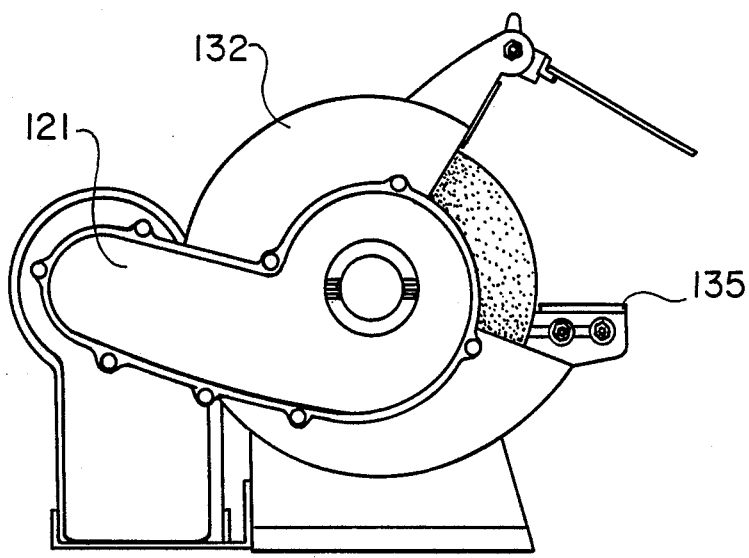
FIG. 6. A left side view of the implementation example.
Figure 7:
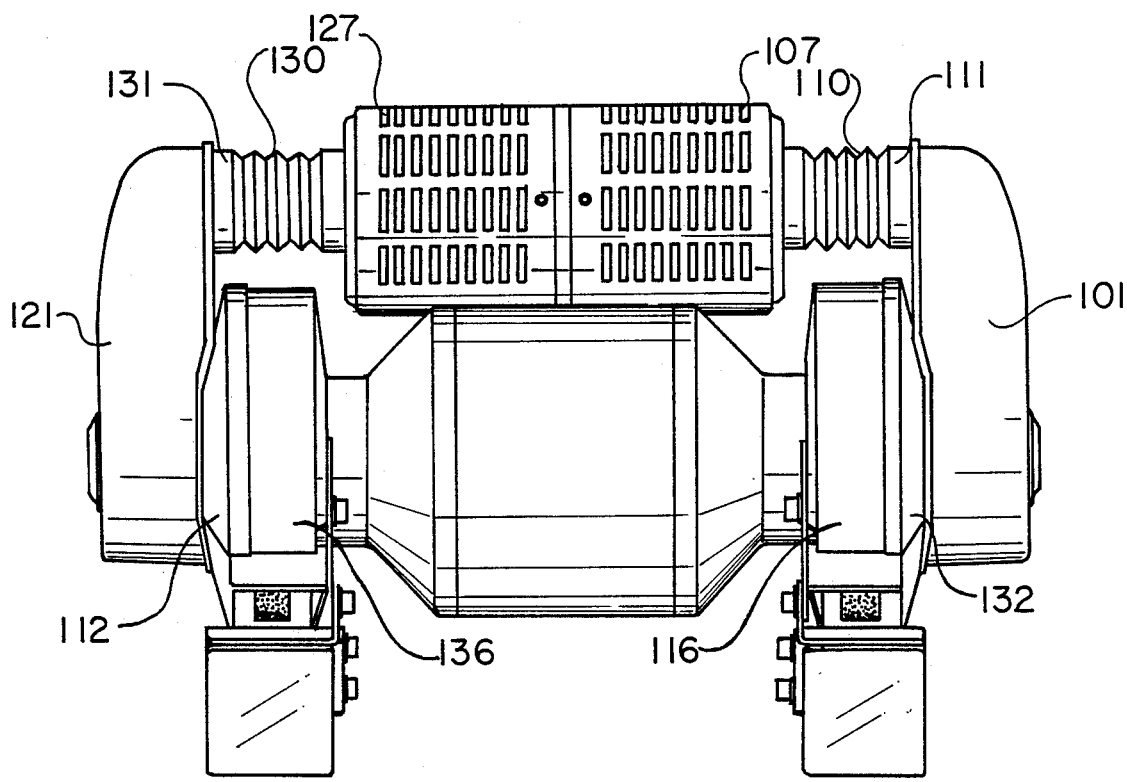
FIG. 7. A top side view of the implementation example.
Figure 8:
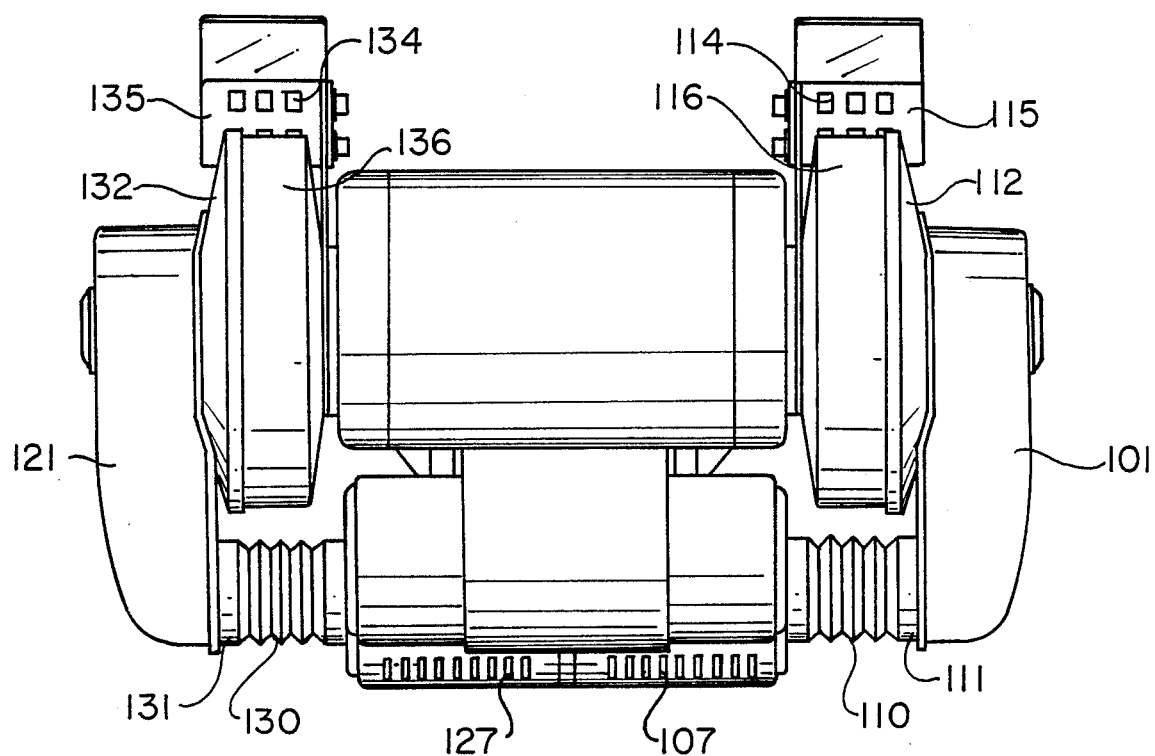
FIG. 8. A bottom side view of the implementation example.

The improved details are explained in the followings:

The FIG. 1 is a disassembled view of an implementation example of this improved design. In the Figure, the main points include a grind body (a working element), which rotates in a circular direction about an axis of rotation, a driving motor housing and a bottom base. The main improved features include:

A wind blowing pump cover 112 is used to connect inner housing 116 of a grinder. Together cover 112 and housing 116 comprise a working element housing. Its one side has an annular induction opening formed therein which is oriented substantially parallel to the working element. The induction opening includes a center that is positioned, such that the axis of rotation substantially passes therethrough and an annular, outwardly-extending frusto-conical skirt 113 of which inner part is smaller than the outer part and spreading wider outward is formed about the induction opening. A centrifugal system wind pump 100 is secured to a grinder shaft on which the grinder (working element) is also secured for concomitant rotational movement therewith.

An extension housing (reservoir housing) 101 is a gyratory shaped cover that is positioned for receiving an outwardly-exhausted current of air having particulate matter therein from the working element housing via the induction opening and the skirt. Its larger round shaped side is used to affix a centrifugal wind pump 100. Its smaller side is used to connect a side cover 103 that has an induction hole (induction aperture) 102; then, an induction hole 102 and a snake pipe 110 are fixed by a fixing ring 111, so that a received current of air having particulate matter therein exits the reservoir housing.

A two sectioned system filter box or filter housing (it may be one body system) is secured to the reservoir housing. This filter housing is an upright, side opening box which consists of a right side 105 and a left side 125 each of which has an entry aperture formed therein. Each entry aperture is aligned in communication with the induction aperture formed in the reservoir opening via snake pipe 110, whereby received current of air having particulate matter therein exits the reservoir through the said induction aperture 102 enters the filter housing.

The air exhaust openings (exhaust apertures) 107 are on the right side 105 and connected with a central connection socket 104. Openings 107 permit the exhausting of a cleaned current of air from the filter housing. Both sides of a connection socket have a semi-circle protrusions 117 on the inner top of the filter box which is at the right side of 117, there is the same semi-circle protrusion for snapping a filter net supporter 108 and a filter net 109, so that the filter is positioned in the filter housing between the entry and the exhaust apertures. In this fashion, the received current of air having particulate matter therein passes through the filter, whereby the particulate matter is separated from the current of air creating the cleaned current of air.

On the adjoining side between the above stated inner side housing 116 of the grinder and a motor housing, a grinding point tool rest 115 is attached. It extends into the grinding point aperture formed in the working element housing where the inner side housing 116 of the grinder and a wind blowing pump cover 112 are connected together. Its main feature is that on the tool rest 115, there are ventilation holes (apertures) 114, which functions to reduce the wind resistance, permits a current of air to flow therethrough and enhance anti-pollution efficiency of the dust inhalation.

Similarly, the same structure is made to its left side which includes:

A wind blowing pump cover 132 is used to connect inner housing 136 of a grinder (working element). Together cover 132 and housing 136 comprise a working element housing. Its one side has an annular induction opening formed therein which is oriented substantially parallel to the working element. The induction opening includes a center that is positioned, such that the axis of rotation substantially passes therethrough. An annular outwardly-exhausting frusto-conical skirt 133 of which inner part is smaller than the outer part and spreading wider outward is formed about the induction opening. A centrifugal system wind pump 120 is secured on a grinder shaft on which the grinder (working element) is also secured for concomitant rotational movement therewith.

An extension housing (reservoir housing) 121 is a gyratory shaped cover that is shaped and positioned annular to receive the outwardly-exhausted current of air having particulate matter therein from the working element housing via the reduction opening and the skirt. Its larger round shaped side is used to affix a centrifugal wind pump 120. Its smaller side is used to connect a side cover 123 that has an induction hole (induction aperture) 122, then an induction hole 122 and a snake pipe 130 are fixed by a fixing ring 131, so that a received current of air having particulate matter therein exits the reservoir housing.

The right side 125 of a two sectioned system filter box or filter housing secured to the reservoir housing. This filter housing is an upright, side opening box. The air exhaust opening 127 are on it and connected with a central connection socket 104. The top of a connection socket has a semi-circular protrusion 117. On the inner top of the filter box which is at the left side of 117, there is the same semi-circle protrusion for snapping a filter net supporter 128 and a filter net (filter) 129, so that the filter is positioned in the filter housing between the entry and exhaust apertures. In this fashion, the received current of air having particulate matter therein passes through the filter, whereby the particulate matter is separated from the current of air creating the cleaned current of air.

On the adjoining side between the above stated inner side housing 136 and a motor housing, a grinding point tool rest 115 is attached. It extends into the grinding point aperture formed in the working element housing where the inner side housing 136 of the grinder and a wind blowing pump cover 132 are connected together. Its main feature is that on the tool rest 135, there are ventilation holes (apertures) 134 or an openings which function to reduce the wind resistance permits a current of air to flow therethrough and enhance anti-pollution efficiency of the dust inhalation.

The above stated anti-polution improvement on a bench grinder adds a better anti-polution function. Please examine this addition according to the law.

I claim:

1. In combination with a bench grinder having a main housing including a motor provided with a motor shaft, an abrasive wheel on the shaft, and a guard housing secured to the main housing and surrounding the wheel, a dust collecting system comprising a fan housing secured to the guard housing laterally thereof, the guard housing having a lateral opening formed therein for communicating the guard housing with the fan housing, the motor shaft extending through the lateral opening in the guard housing and into the fan housing, a fan carried by the extending motor shaft in the fan housing, the fan housing having a portion extending rearwardly therefrom and substantially parallel to the guard housing, a filter housing secured to the main housing rearwardly thereof in close proximity to said motor, the bottom of said main housing and said filter housing being coplanar, conduit means connecting the rearwardly-extending portion of the fan housing with the filter housing, the filter housing having a plurality of air exhaust openings formed therein, and a filter supported within the filter housing inwardly of the air exhaust openings therein, whereby the fan draws the dust-laden air axially of the motor shaft and through the lateral opening in the guard housing away from said motor and said abrasive wheel and into the fan housing, and whereby the dust-laden air passes rearwardly into the rearwardly-extending portion of the fan housing and then through the conduit means and substantially parallel to the motor shaft and into the filter housing, and whereby the air thereafter passes through the filter and out of the air exhaust openings in the filter housing; wherein the filter housing has a top semi-cylindrical portion having the air exhaust openings formed therein, and wherein the filter is relatively-thin and substantially semi-cylindrical and is supported within the top semi-cylindrical portion of the filter housing substantially beneath the air exhaust openings formed therein, the axis of said semi-cylindrical filter housing being parallel to the shaft of the motor and abrasive wheel.

2. The combination of claim 1, wherein the motor shaft is double ended and carries a pair of respective abrasive wheels, wherein a dust collecting system is provided for each of the abrasive wheels, and wherein a pair of filter housings are provided, the filter housings being secured to the main housing rearwardly thereof, and the filter housings being disposed laterally of one another.

* * * * *